United States Patent [19]

Blaha

[11] Patent Number: 4,856,187

[45] Date of Patent: Aug. 15, 1989

[54] APPARATUS AND METHODS FOR MAKING TERMINATED WIRE SEGMENTS

[75] Inventor: Gerald Blaha, Waukesha, Wis.

[73] Assignee: Artos Engineering Company, New Berlin, Wis.

[21] Appl. No.: 175,862

[22] Filed: Mar. 31, 1988

[51] Int. Cl.⁴ ........................ H01R 43/04; B23P 23/00

[52] U.S. Cl. .................................. 29/867; 29/564 G; 29/56.6; 81/951

[58] Field of Search ..................... 29/56.6, 564.6, 753, 29/857, 564.4, 863, 867; 81/9.51

[56] References Cited

U.S. PATENT DOCUMENTS

| | | | |
|---|---|---|---|
| 3,742,564 | 7/1973 | Dyksterhouse | 29/564.6 X |
| 3,791,008 | 2/1974 | Dyksterhouse | 29/56.6 |
| 3,939,552 | 2/1976 | Hart et al. | 81/9.51 X |
| 4,166,315 | 9/1979 | Gudmestad et al. | 29/564.6 X |
| 4,171,566 | 10/1979 | Tominoi | 29/564.6 X |
| 4,403,407 | 9/1983 | Mazzola | 29/564.6 X |
| 4,489,476 | 12/1984 | Over et al. | 29/863 X |
| 4,628,600 | 12/1986 | Gordon et al. | 81/9.51 X |
| 4,653,160 | 3/1987 | Thorkildsen et al. | 29/564.6 X |

FOREIGN PATENT DOCUMENTS

| | | | |
|---|---|---|---|
| 921777 | 3/1963 | United Kingdom | 29/857 |

*Primary Examiner*—Timothy V. Eley
*Assistant Examiner*—Carl J. Arbes
*Attorney, Agent, or Firm*—James E. Nilles; Thomas F. Kirby

[57] ABSTRACT

A wire feed mechanism alternately feeds a pair of parallel wire strands A and B through spaced-apart turret jaws on a rotatable turret, through a cutter-stripper head, through a wire gathering device and through spaced-apart conveyor clamps in a conveyor. When a desired length of first wire strand A is fed, a first conveyor clamp closes on strand A and the cutter-stripper head severes a wire segment 12A from strand A and strips the newly-severed ends of strand A and wire segment 12A. The turret then rotates 90° in one direction to present the stripped end of strand A to a first terminating machine which attaches a terminal thereto. While termination of strand A occurs, a desired length of the other strand B is fed through the cutter-stripper head and wire gathering device and through a second conveyor clamp, whereupon the latter clamp closes on strand B and the cutter-stripper head severs a wire segment 12B from strand B and strips the severed ends of strand B and wire segment 12B. The turret then pivots 90° in the opposite direction to present the stripped end of strands B to a second terminating machine which attaches a terminal thereto. The conveyor moves both wire segments 12A and 12B to a location where a wire lifter mechanism lifts wire segment 12A from the first conveyor clamp, where the conveyor moves wire segment 12B in the second conveyor clamp below wire segment 12A, and where a third terminating machine which attaches a single common terminal to the stripped ends of both sements 12A and 12B to provide a wire harness.

16 Claims, 13 Drawing Sheets

APPARATUS AND METHODS FOR MAKING TERMINATED WIRE SEGMENTS

BACKGROUND OF THE INVENTION

1. Field of Use

This invention relates generally to apparatus and methods for making wire segments of desired length and for attaching wire terminals to one or both ends of each segment.

In particular, it relates to making wire harnesses, each of which comprises a plurality of wire segments, each wire segment having a terminal at one end and all wire segments having a common terminal at their other ends.

2. Description of the Prior Art

Prior art apparatus and methods of the aforesaid character typically feed a wire strand along a path, cut successive wire segments of desired length from the wire strand and subsequently attach wire terminals to one or both ends of each segment. In some cases a common terminal is attached to the ends of several wire segments. U.S. Pat. Nos. 4,713,880; 4,707,913 and 4,653,160, assigned to the same assignee as the present application exemplify the prior art. Sequential severance of wire segments from a wire strand and subsequent attachment of terminals is a time-consuming and costly production process. It is desirable, therefore, to provide improved apparatus and methods which enable faster production speeds and more efficient production than was heretofore available, so as to reduce production costs and afford other advantages.

SUMMARY OF THE PRESENT INVENTION

The present invention provides improved apparatus and methods whereby two wire strands are simultaneously processed so that, while one strand, already terminated at its free end, is being fed and cut to provide a wire segment of desired length, the other strand is being provided with a terminal at its free end. In further accordance with the invention, a plurality of such wire segments of desired length, each already terminated at one end, are then provided with a common terminal at their other end.

The invention is capable of processing uninsulated or insulated wire strands, but is disclosed as processing the latter.

A preferred embodiment of the improved apparatus comprises: a wire feed mechanism for alternately feeding two wire strands designated as A and B; a wire placement mechanism having a pivotable turret with two spaced-apart jaws 52A and 52B thereon and located downstream of the wire feed mechanism; first and second terminal attachment mechanisms or presses located on opposite lateral sides of the turret mechanism; a cutter-stripper mechanism located downstream of the turret mechanism; a wire gathering mechanism located downstream of the cutter-stripper mechanism; a conveyor mechanism having a succession of spaced-apart conveyor clamps therealong and located downstream of the cutter-stripper mechanism and beneath the wire gathering mechanism; a third terminal attachment mechanism or press positioned alongside the conveyor mechanism at a location downstream of the cutter-stripper mechanism; and a wire lifter or doubler mechanism at said location and positioned adjacent the third terminal attachment mechanism or press and above the conveyor mechanism.

In operation, the wire feed mechanism alternately feeds one of two wire strands through the wire placement mechanism, through the cutter-stripper mechanism, and through the wire gathering mechanism over the conveyor, while the wire placement mechanism presents the free end of the other wire strand to one terminal press for attachment of a terminal thereto. After a desired length of said one strand has been fed, the strand is gripped by a conveyor clamp and a wire segment of desired length is severed therefrom and stripped. While the feeding, severance and stripping of said one wire strand is occurring, a terminal is being attached to the other strand by said one press. Then, the wire placement mechanism rotates to present the newly severed and stripped free end of said one wire strand to the other terminal press for attachment of a terminal thereto. While the terminal is being attached to said one wire strand, the wire feed mechanism feeds the now-terminated free end of said other wire strand through the wire placement mechanism, through the cutter-stripper mechanism, and through the wire gathering mechanism. After a desired length of said other strand has been fed, a wire segment of desired length is severed therefrom and stripped. Such feeding, severance and stripping occurs while a terminal is being attached to said one strand. Thereafter, the entire aforedescribed cycle is repeated. After each wire segment has been severed, it is moved by its respective conveyor clamp to a location adjacent the third terminal press. When a wire segment cut from the said one strand reaches the said location, it is gripped by the lifter jaw, released by its conveyor clamp and raised by the lifter jaw. When the next successive wire segment cut from the said other strand reaches the said location, it is below and closely adjacent the raised wire segment held in the lifter jaw. The unterminated ends of both segments are then presented to the third press for attachment of a common terminal thereto. Thereafter, the finished wire harness is transported by the conveyor and discharged therefrom. The invention presupposes provision of control means to effect coordinated operation of the several mechanisms, such as the control means disclosed in U.S. Pat. No. 4,653,160, for example.

The apparatus and method in accordance with the present invention provide several advantages over the prior art. For example, since one wire strand is being fed, severed and stripped while a terminal is simultaneously being attached to the free end of the other segment, processing time is cut in half, as compared to prior art arrangements thereby resulting in cost-reduction and time-saving. Furthermore, the two strands being processed could be of the same or different wire sizes or colors. The two segments cut from the two strands could be of the same or different lengths, as compared to each other. The severed stripped end of a wire segment could be left unterminated or could be provided with an individual terminal or, as in the preferred embodiment, the severed stripped ends of two wire segments could be attached to a common terminal. The apparatus in accordance with the invention is efficient and reliable in use, economical to fabricate and service, and eliminates several redundant mechanisms required in prior art apparatus. Other objects and advantages of the invention will hereinafter appear.

DRAWINGS

DESCRIPTION OF PREFERRED EMBODIMENT

The Apparatus

Figures 1, 2, 3:
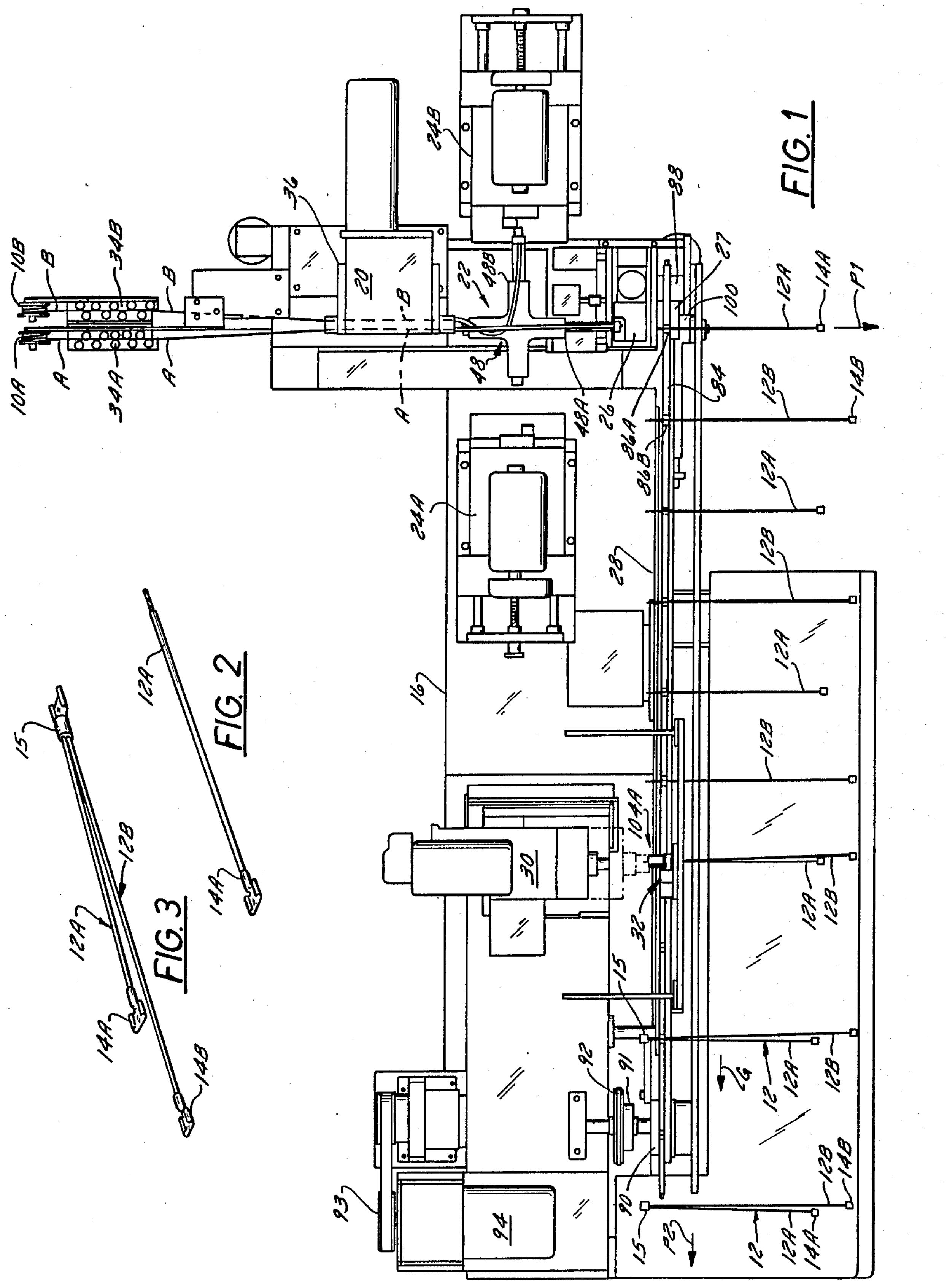
FIG. 1 is a top plan view of wire processing apparatus in accordance with the invention.
FIG. 2 is a perspective view of a terminated wire segment fabricated by the apparatus of FIG. 1.
FIG. 3 is a perspective view of a terminated wire harness comprising two wire segments shown in FIG. 2 and fabricated by the apparatus of FIG. 1.
Figure 4:
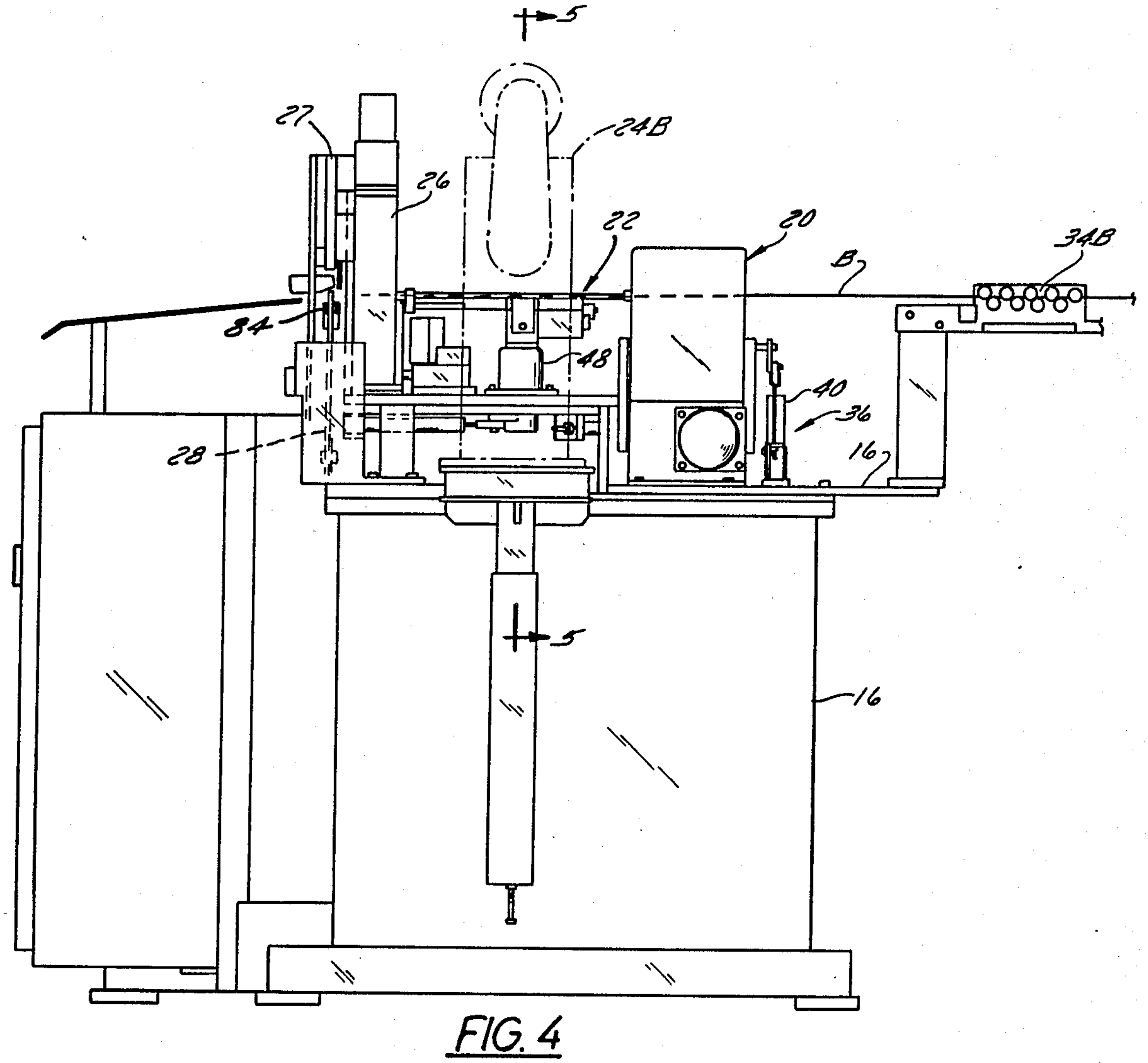
FIG. 4 is an elevation view of the infeed end of the apparatus of FIG. 1.
Figure 5:
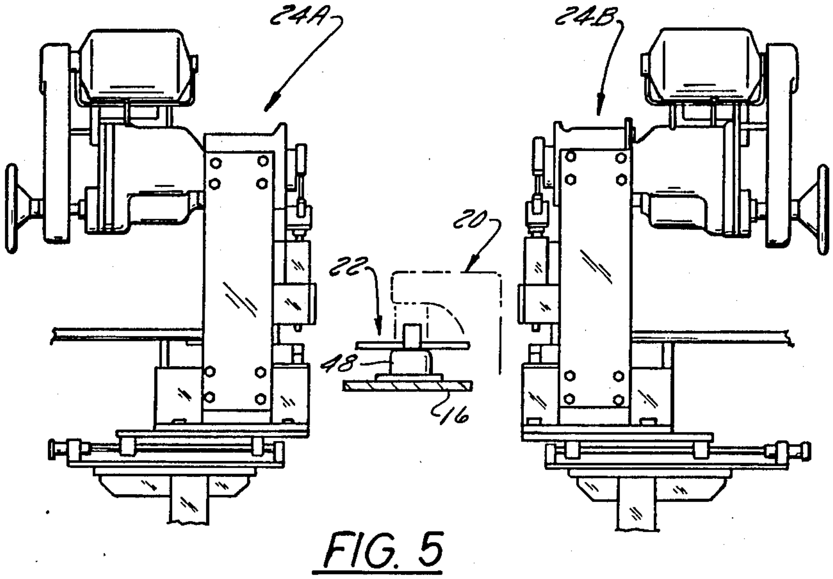
FIG. 5 is an elevation view of two terminal attachment presses taken on line 5—5 of FIG. 4.
Figure 6:
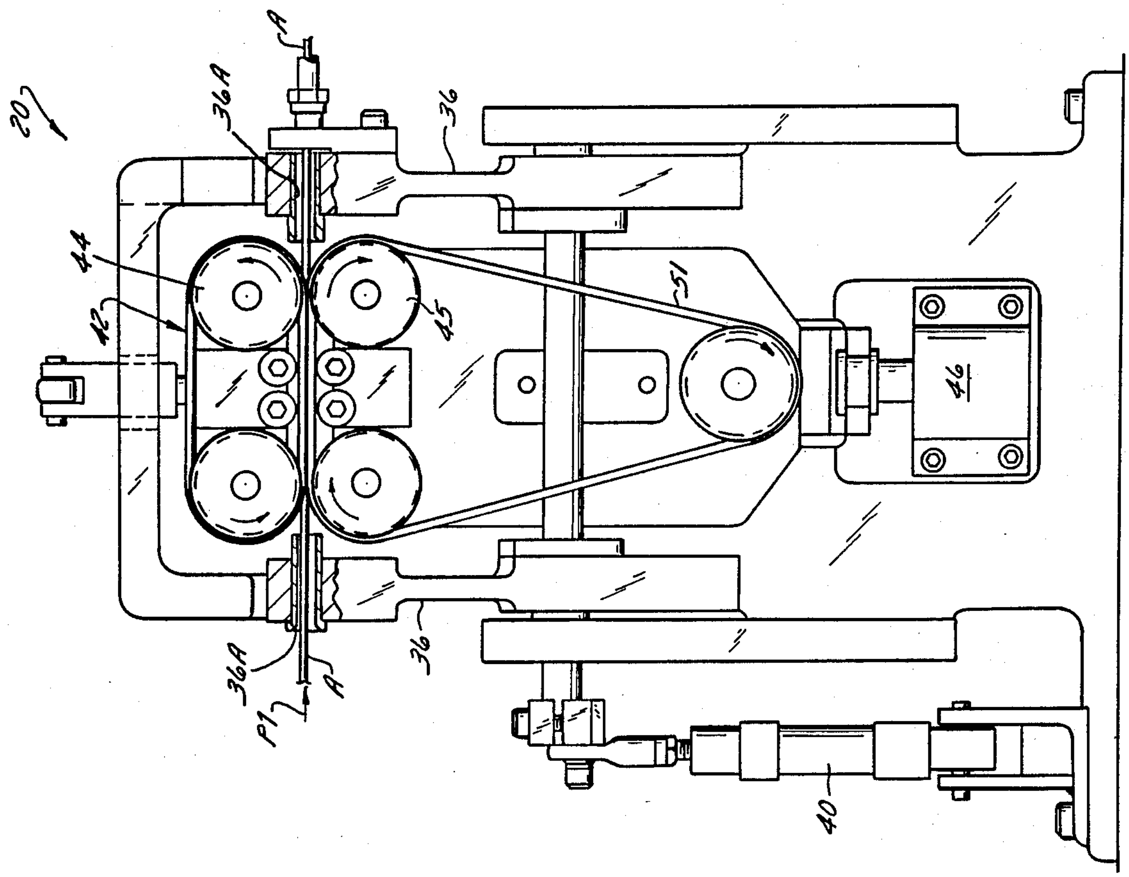
FIG. 6 is an enlarged side elevation view of a wire feed mechanism shown in FIGS. 1 and 4.
Figure 7:
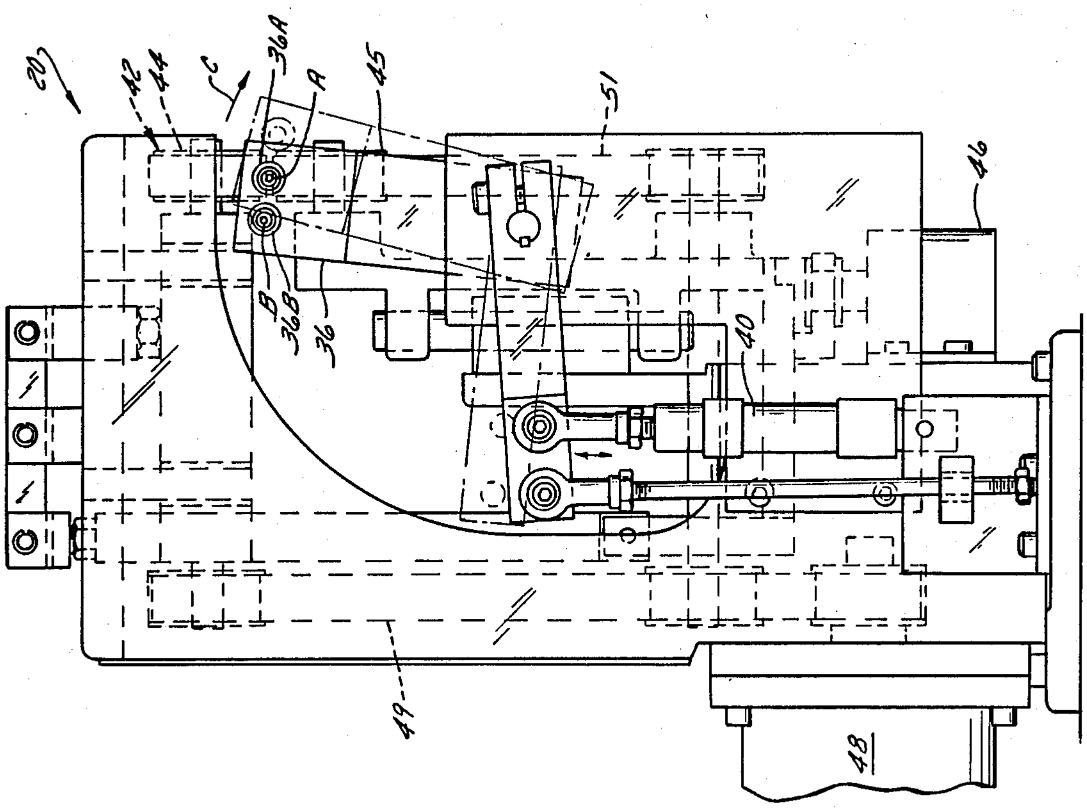
FIG. 7 is an end elevation view of the wire feed mechanism shown in FIG. 6.

FIGS. 1 and 4 are top plan and end views, respectively, of a preferred embodiment of wire processing apparatus in accordance with the present invention for processing two wire strands A and B which are supplied from wire supply reels 10A and 10B, respectively. The apparatus finally provides a plurality of wire harnesses, such as wire harness 12 shown in FIG. 3 which comprises a wire segment 12A; a wire segment 12B; single wire terminals 14A and 14B connected to one end of each segment 12A and 12B, respectively; and a common wire terminal 15 connected to the other ends of both segments 12A and 12B.

The strands A and B are insulated wire strands from which insulation must be stripped prior to terminal attachment. The strands A and B may be of the same or different wire sizes or color. The wire segments 12A and 12B, which are cut from the strands A and B, respectively, may be of the same or different lengths but are shown in FIG. 3 with segment 12A being relatively shorter than segment 12B.

The present invention provides improved apparatus and methods whereby the two wire strands A and B are simultaneously processed so that, while one strand, already terminated at its free end, is being fed and cut to provide a wire segment 12A or 12B of desired length, the other strand is being provided with a terminal 14A or 14B at its free end. In further accordance with the invention, a plurality of wire segments, such as 12A and 12B, of desired length, each already terminated at one end, as with terminals 14A and 14B, are then provided with a common terminal 15 at their other end. The invention is capable of processing uninsulated or insulated wire strands, but is disclosed as processing the latter.

The apparatus generally comprises a rigid support structure or frame 16 on which the following components or mechanisms generally comprising the apparatus are mounted, namely: a wire feed mechanism 20; a wire placement mechanism 22; first and second terminal attachment mechanisms or presses 24A and 24B, respectively; a wire cutter-stripper mechanism 26; a wire gathering mechanism 27; a conveyor mechanism 28; a third terminal attachment mechanism or press 30; and a wire lifter or doubler mechanism 32.

A preferred embodiment of the improved apparatus comprises the mechanisms hereinafter described which, are operated by control means (not shown) of a type disclosed in U.S. Pat. No. 4,653,160, for example.

Wire feed mechanism 20 alternately feeds the two wire strands A and B. Wire placement mechanism 22 has a pivotable turret 48 with two spaced-apart jaws 52A and 52B thereon and located downstream of the wire feed mechanism. The first and second terminal attachment mechanisms or presses 24A and 24B are located on opposite lateral sides of turret 48. The cutter-stripper mechanism 26 is located downstream of turret 48. The wire gathering mechanism 27 is located downstream of cutter-stripper mechanism 26. The conveyor mechanism 28 has a succession of spaced-apart conveyor clamps, such as 86A and 86B, therealong and located downstream of cutter-stripper mechanism 26 and beneath wire gathering mechanism 27. The third terminal attachment mechanism or press 30 is positioned alongside conveyor mechanism 28 at a location downstream of cutter-stripper mechanism 26. The wire lifter or doubler mechanism 32, which has a lifter jaw 106, is also disposed at said location and is positioned adjacent the third terminal attachment mechanism or press 30 and above conveyor mechanism 28.

In operation, wire feed mechanism 20 alternately feeds one of the two wire strands, A, for example, through wire placement mechanism 22, through cutter-stripper mechanism 26, and through wire gathering mechanism 27 over conveyor mechanism 28, while wire placement mechanism 22 presents the free end of the other wire strand B, for example, to one terminal press 24B for attachment of terminal 14B thereto. After a desired length of strand A has been fed, the strand A is gripped by conveyor clamp 86A and other means (hereinafter described) and a wire segment 12A of desired length is severed therefrom. Feeding and severance of strand A occurs while terminal 14B is being attached to strand B. The turret 48 of wire placement mechanism 22 rotates to present the newly severed free end of wire strand A to the other terminal press 24A for attachment of terminal 14A thereto. Wire feed mechanism 20 feeds the now-terminated free end of the other wire strand B through wire placement mechanism 22, through cutter-stripper mechanism 26, and through the wire gathering mechanism 27. After a desired length of strand B has been fed, a wire segment 12B of desired length is severed therefrom. Feeding and severance of strand B occurs while terminal 14A is being attached to strand A. Then, the entire aforedescribed cycle is repeated. After each wire segment 12A, 12B has been severed, it is moved by its respective conveyor clamp 86A, 86B to a location adjacent third terminal press 30. When wire segment 12A cut from the strand A reaches the said location, it is gripped by lifter jaw 106, released by its conveyor clamp 86A and raised by the lifter jaw. When the next successive wire segment 12B cut from strand B reaches the said location, it is below and closely adjacent the raised wire segment 12A held in lifter jaw 106. The unterminated ends of both segments 12A and 12B are then presented to the third press 30 for attachment of a common terminal 15 thereto. Thereafter, the finished wire harness 12 is transported by conveyor mechanism 28 and discharged therefrom.

Wire Feed Mechanism

Referring to FIGS. 1, 4, 6 and 7, wire feed mechanism 20 comprises a pair of conventional wire straightener devices 34A and 34B; a wire shifter device 36 having an actuator 40 (FIGS. 6 and 7) selectively operable to oscillatably move device 36 to and fro in the direction of arrow C (FIG. 7); and a wire feed device 42 comprising a pair of separable sets of rotatable feed wheels 44 and 45 and having an actuator 46 selectively operable to move the wheel sets 44 and 45 between open and closed positions and a motor 48 and drive belts 49 and 51 therefor operable to intermittently rotatably drive the wheel sets 44 or 45. Wire feed device 42 is similar in construction and mode of operation to that disclosed in U.S. Pat. No. 4,713,880 hereinbefore referred to, except that it alternately feeds two wire strands.

The wire strands A and B extend through holes 36A and 36B, respectively, in shifter device 36 which then operates to alternately shift the wire strands A and B between the wheel sets 44 and 45 while the latter are open so that, when the wheel sets close and motor 48 operates, the wire strand therebetween (A or B) is fed through wire placement mechanism 22, through wire cutter-stripper mechanism 26, through wire gathering mechanism 27 and over conveyor mechanism 28 along a first path P1 to provide a wire segment 12A or 12B of desired length. The amount of time the wheel sets 44 and 45 are closed and rotating determines the length of a wire segment.

Wire Placement Mechanism

Figures 9, 10:
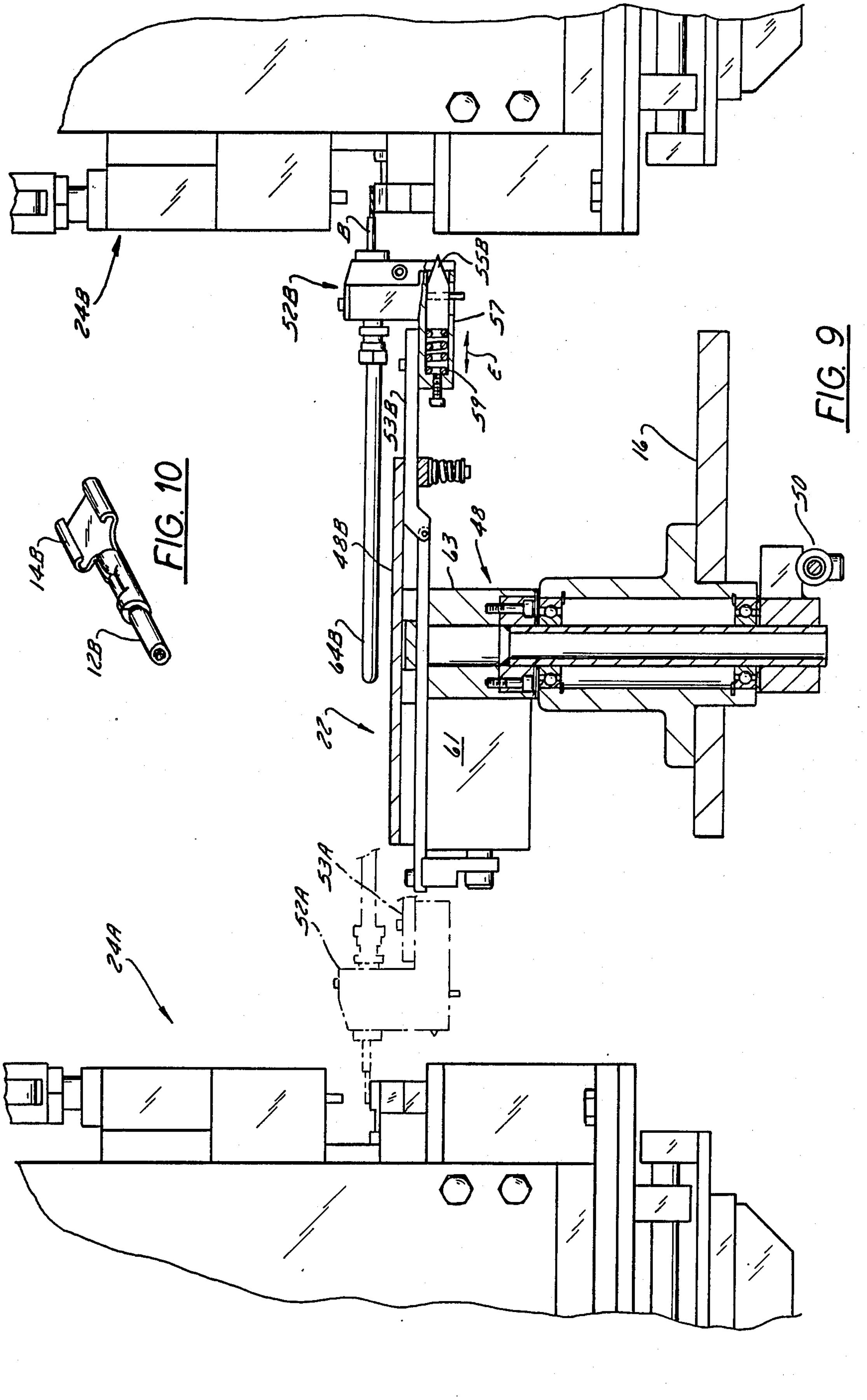
FIG. 9 is an enlarged view, similar to FIG. 5, showing a cross-sectional view of the wire placement mechanism of FIG. 8.
FIG. 10 is an enlarged perspective view of a terminal also shown in FIGS. 2 and 3.
Figures 11, 12:
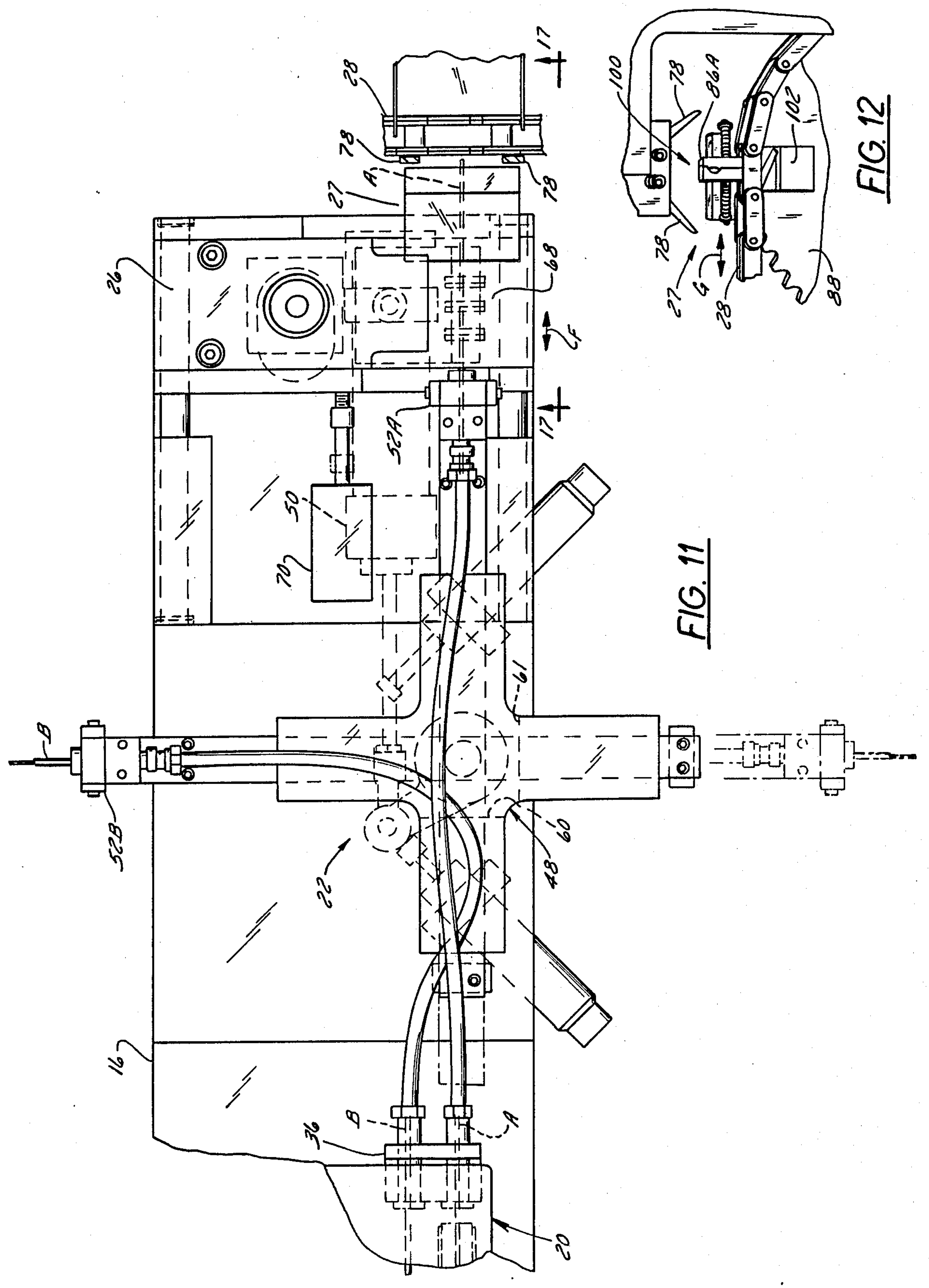
FIG. 11 is a top plan view of the wire placement mechanism shown in FIGS. 8 and 9 and showing it in a first stage of operation.
FIG. 12 is an enlarged side elevation view of a conveyor clamp shown in FIG. 11.
Figure 13:
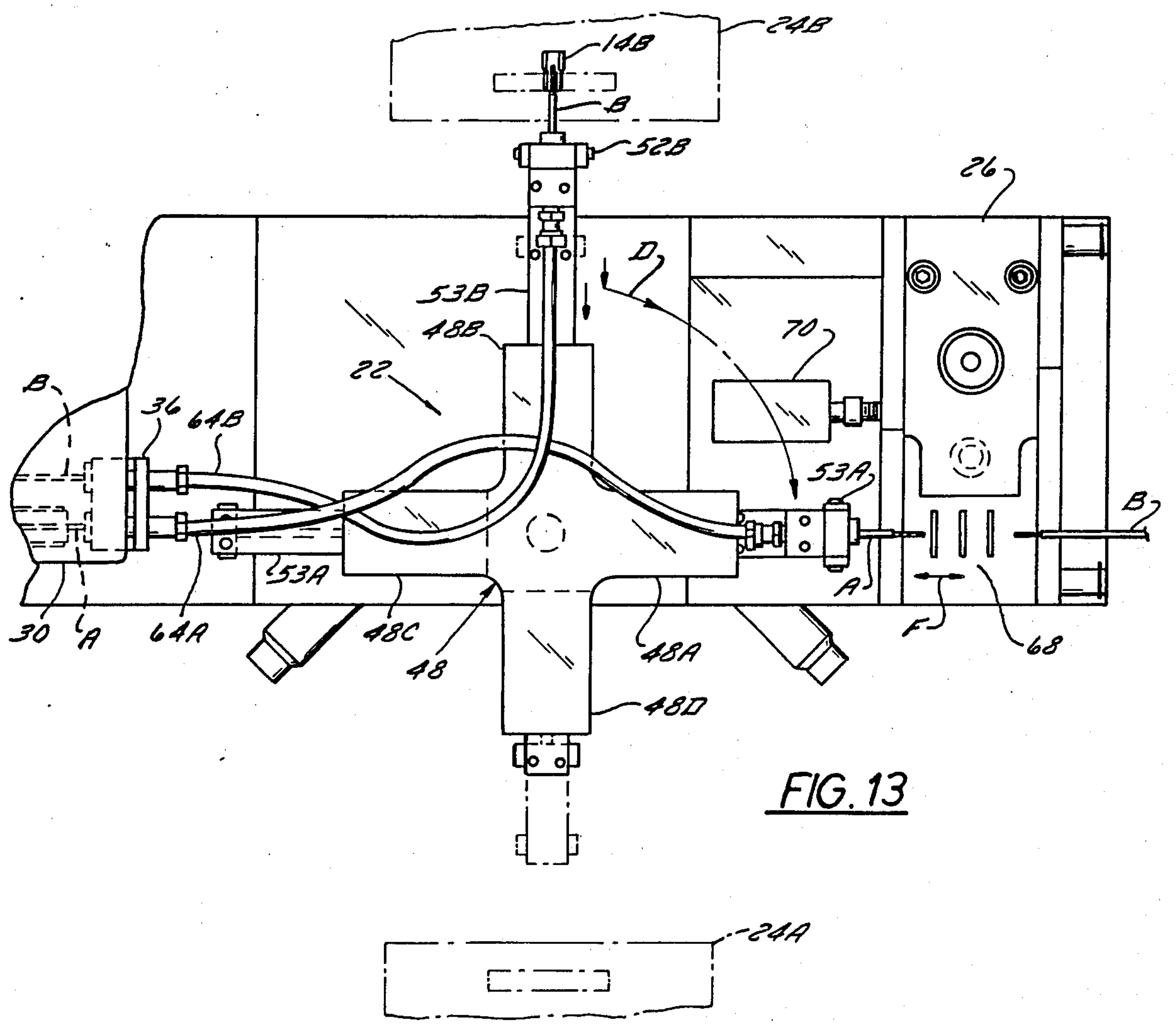
FIG. 13 is a view similar to FIG. 11 showing the wire placement mechanism in another stage of operation.
Figure 14:
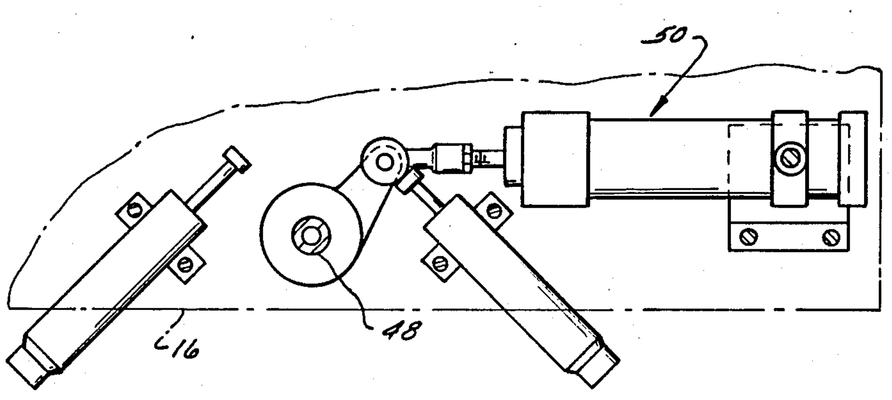
FIG. 14 is a top plan view of an actuator of the wire placement mechanism of FIGS. 11 and 13 taken on line 14—14 of FIG. 8.
Figure 15:
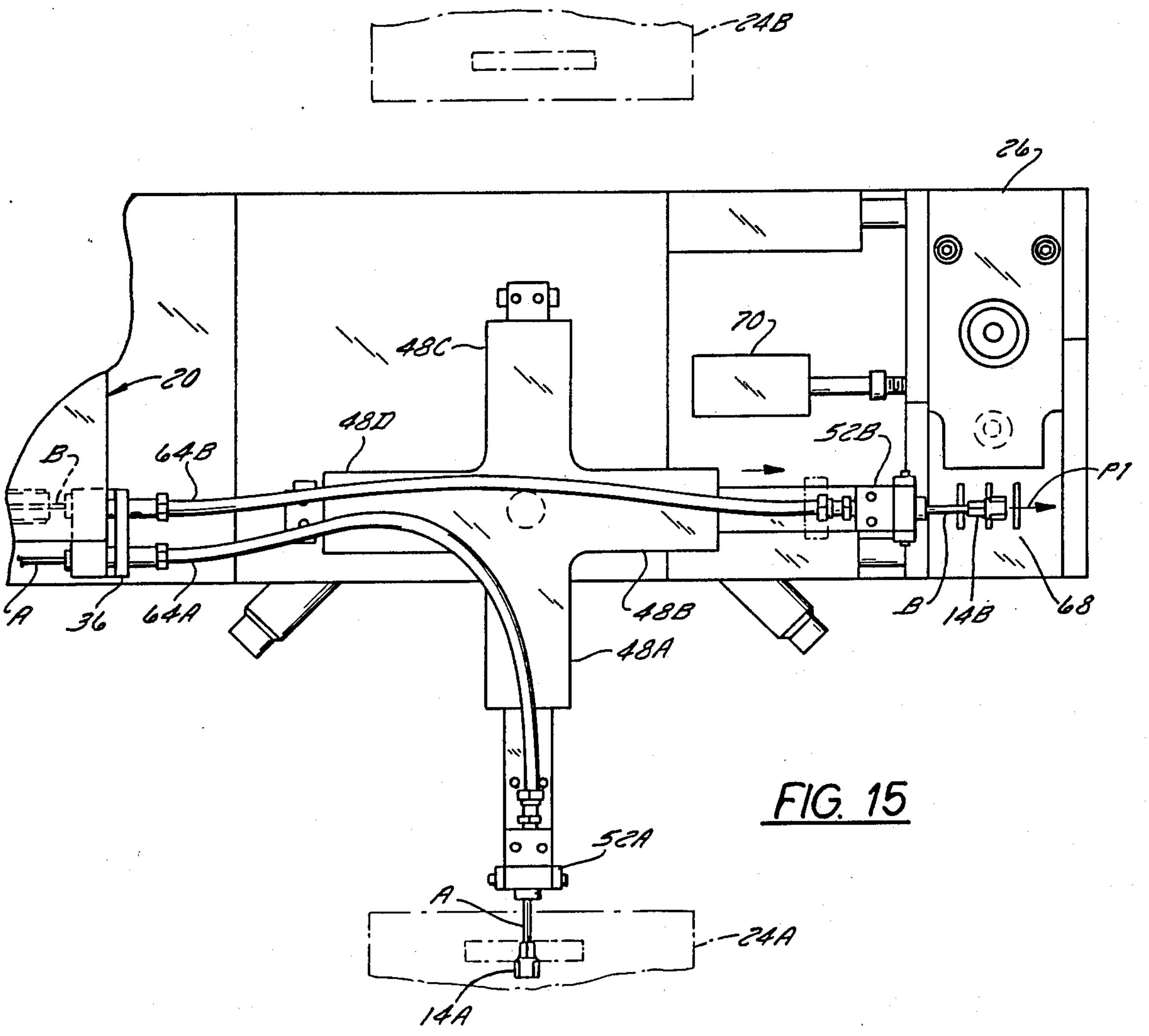
FIG. 15 is a view similar to FIG. 13 showing the wire placement mechanism in still another stage of operation.

Referring to FIGS. 1, 4, 5, 8, 9, 11, 13, 14, 15, 16 and 17, wire placement mechanism 22 comprises a turret 48 having an actuator 50 (FIGS. 8 and 14) selectively operable to oscillatably pivot or rotate turret 48 in the direction of arrow D (FIG. 13) through an arc of 90° between two positions; a pair of separable and retractable turret jaws 52A and 52B mounted on the turret and arcuately spaced apart from each other by 90°; actuators 56 and 57 selectively operable to laterally open and close the turret jaws 52A and 52B, respectively; and actuators 60 (FIG. 8) and 61 (FIG. 9) selectively operable to retract and extend the turret jaws 52A and 52B, respectively, in a horizontal plane in the direction of arrow E for a distance of about 1¼ inches. As FIGS. 11, 13 and 15 show, turret 48 is cruciform and has four arms 48A, 48B, 48C and 48D. The turret jaws 52A and 52B are located on members 53A and 53B, respectively, on the arms 48A and 48B, respectively. Flexible wire guide tubes 64A and 64B through which the strands A and B, respectively, extend are mounted between the turret jaws 52A and 52B, respectively, and oscillating device 36 at the outlet end of wire drive mechanism 20.

Figure 8:
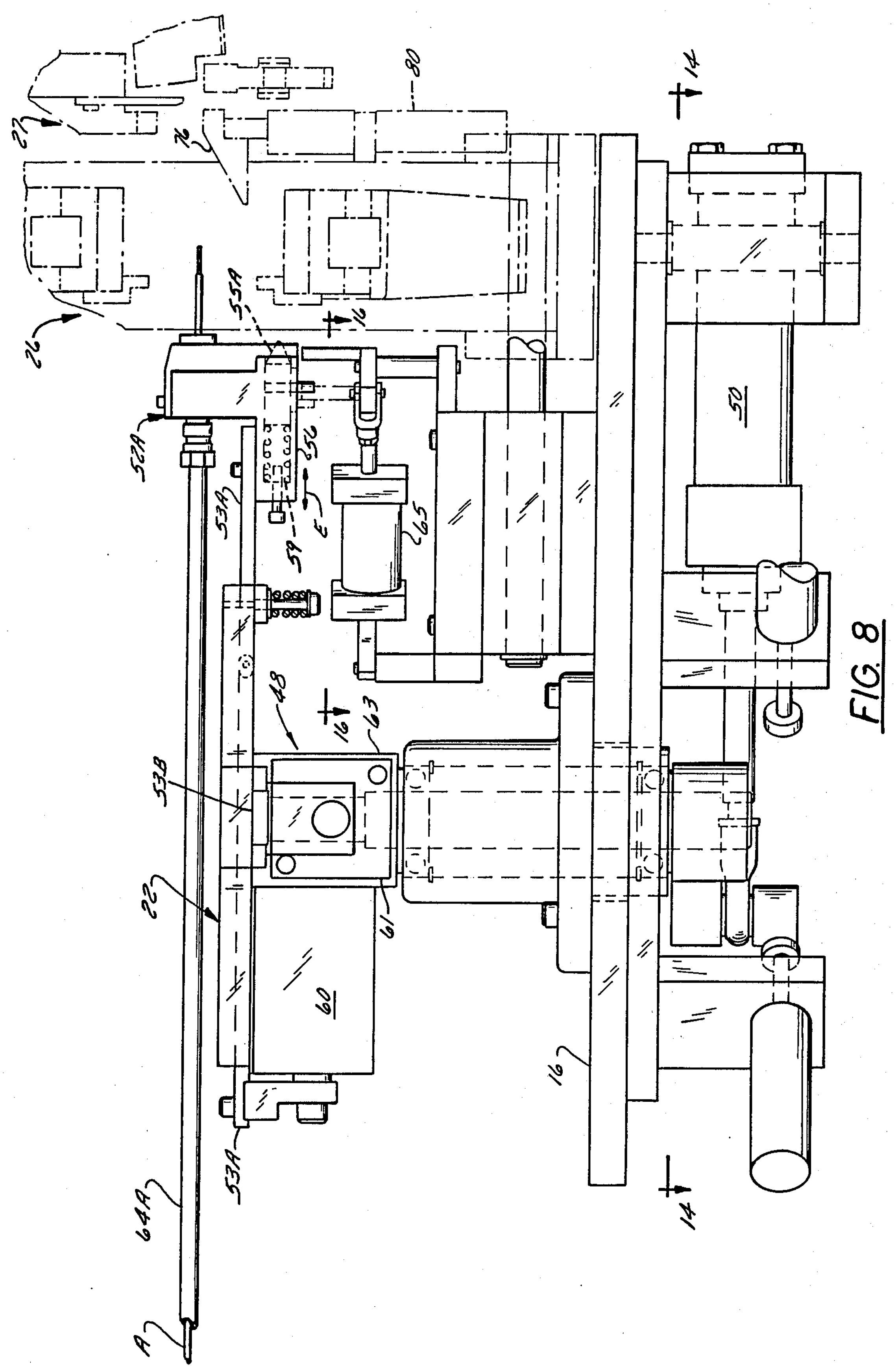
FIG. 8 is an enlarged side elevation view of a wire placement mechanism shown in FIG. 1.
Figure 16:
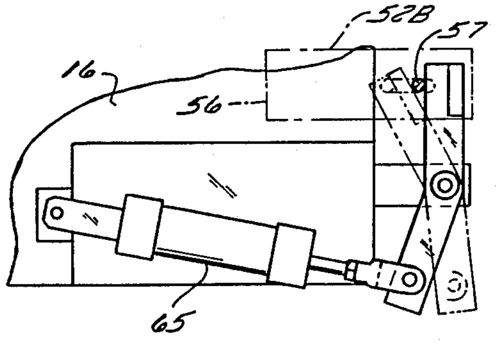
FIG. 16 is a top plan view of an actuator taken on line 16—16 of FIG. 8.

Referring to FIGS. 8, 9, 11, 15 and 16, it is seen that turret jaws 52A and 52B are mounted on the ends of extendable/retractable members 53A and 53B, respectively, which are slidably mounted on the underside of the arms 48A and 48B, respectively. As FIG. 8 shows, member 53A is connected to actuator 60 which operates to effect extension and retraction of member 53A and turret jaw 52A thereon. Similarly, as FIG. 9 shows, member 53B is connected to actuator 61 which operates to effect extension and retraction of member 53B. As FIGS. 8 and 9 show, the actuators 56 and 57 for opening/closing the turret jaws 52A and 52B, respectively, are mounted on and integral with their respective jaws. When each member 53A, 53B is extended, the actuators 56, 57 operate to maintain their respective jaws closed. Spring-biased plungers 55A, 55B are provided in the actuators 56, 57, respectively. Each plunger 55A, 55B is normally biased outwardly by an associated coil spring 59 to maintain the jaws in closed position but the spring can be temporarily compressed. As FIGS. 8 and 16 show, an actuator 65 is provided to engage a pin on each plunger 55A, 55B when its associated turret jaw 52A, 52B is disposed adjacent cutter-stripper mechanism 26. Actuator 65 operates when it is necessary to temporarily open the turret jaw to allow the wire strand to pass therethrough.

Terminal Attachment Mechanisms

The terminal attachment mechanism or presses 24A, 24B and 30 are conventional and may take the form of that shown in U.S. Pat. No. 4,713,880 owned by the same assignee as the present application. The presses which are provided with a supply of suitable wire terminals in a conventional manner, are selectively operable to attach a wire terminal to the stripped end of a wire presented thereto.

The presses 24A and 24B are disposed on opposite lateral sides of wire placement mechanism 22 and arranged so that they can attach single terminals, such as 14A and 14B, respectively, to the stripped free ends of the wire strands A and B, respectively. In FIGS. 1, 8, 9, 11 and 13, turret 48 is shown in one of its two alternate positions and, in that position, its arms 48A, 48B, 48C and 48D are adjacent and confront cutter-stripper mechanism 26, press 24B, feed mechanism 20 and press 24A, respectively. When turret 48 is rotated to its other position, as shown in FIG. 15, its arms 48A, 48B, 48C and 48D are adjacent and confront press 24A, cutter-stripper mechanism 26, press 24B and feed mechanism 20, respectively.

When turret 48 is in its said one position shown in FIGS. 1, 8, 9, 11 and 13, turret jaw 52A is initially open and extended and wire segment A can be fed through cutter-stripper mechanism 26, over conveyor mechanism 28 by gathering mechanism 27 and along first path P1 for a desired distance; whereas turret jaw 52B is closed and extended and wire segment B can be presented to press 24B.

When turret 48 is in its said other position, shown in FIG. 15, turret jaw 52B is initially open as a result of operation of actuator 65 and extended and wire segment B can be fed through cutter-stripper mechanism 26, over conveyor mechanism 28 by gathering mechanism 27 and along first path P1 for a desired distance; whereas turret jaw 52A is closed and extended and wire segment A can be presented to press 24A.

Referring to FIGS. 1, 20, 21 and 22, the press 30 is disposed alongside conveyor mechanism 28 at a location downstream of wire cutter-stripper mechanism 26 and near the discharge end of the conveyor mechanism. Press 30 is arranged so that it can attach a common terminal, such as 15, to both of the stripped unterminated severed ends of the wire segments 12A and 12B.

Wire Cutter-Stripper Mechanism

Figure 17:
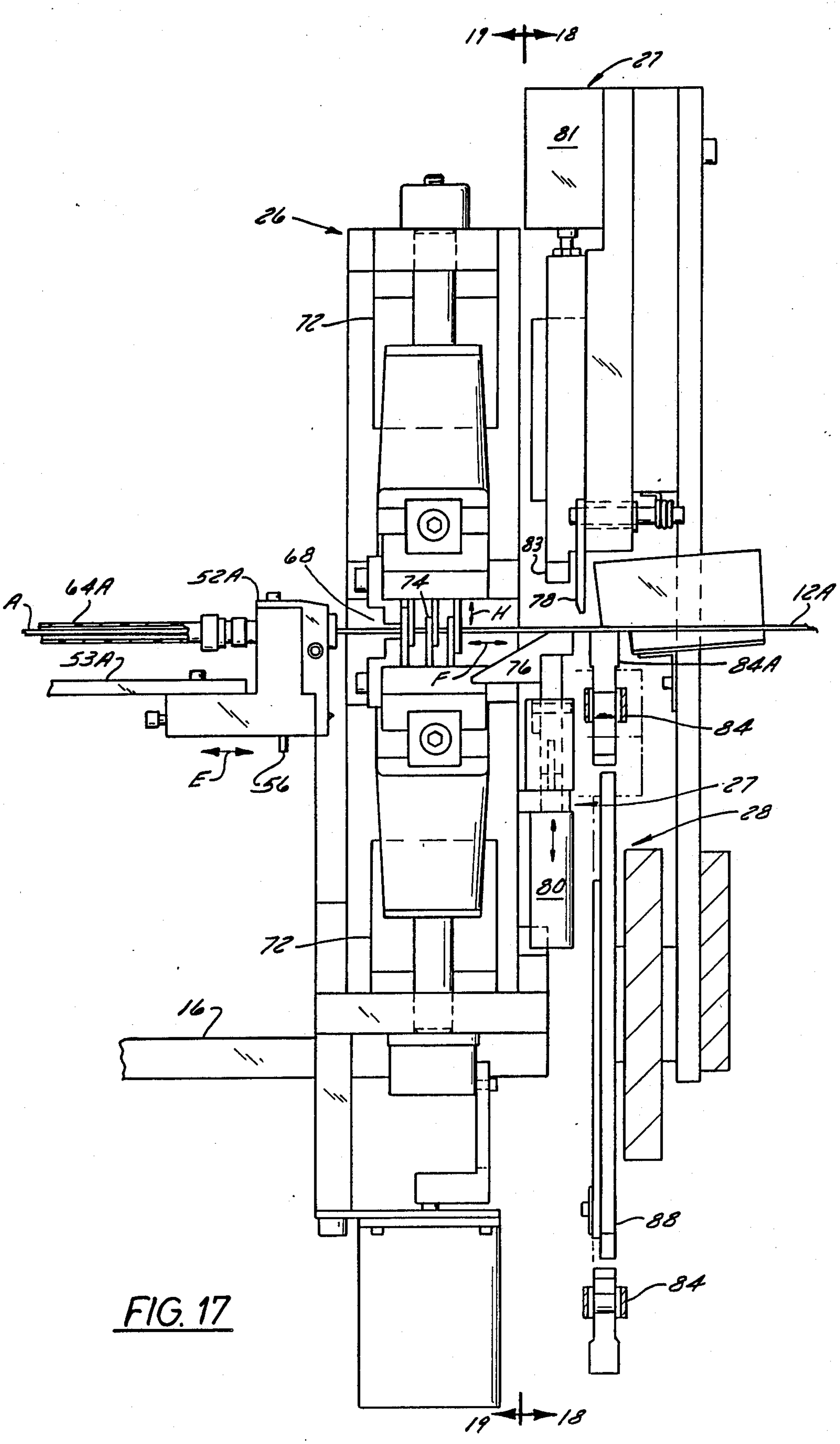
FIG. 17 is a side elevation view of a wire cutter-stripper mechanism taken on line 17—17 of FIG. 11.
Figure 18:
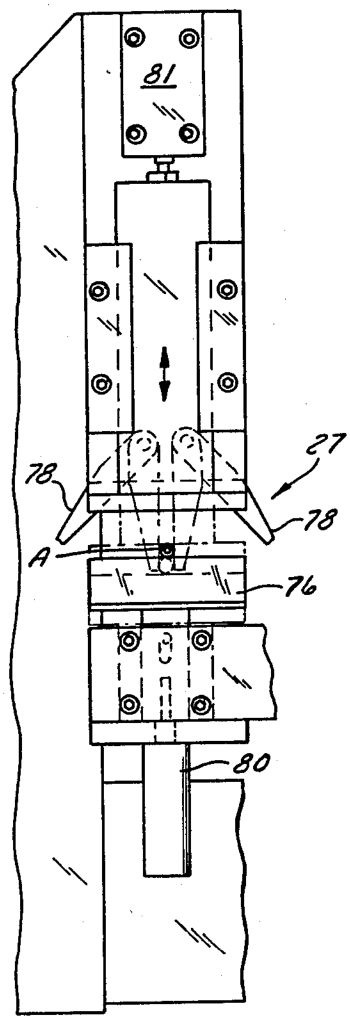
FIG. 18 is an end elevation view taken on line 18—18 of FIG. 17 and shows a gathering mechanism.
Figure 19:
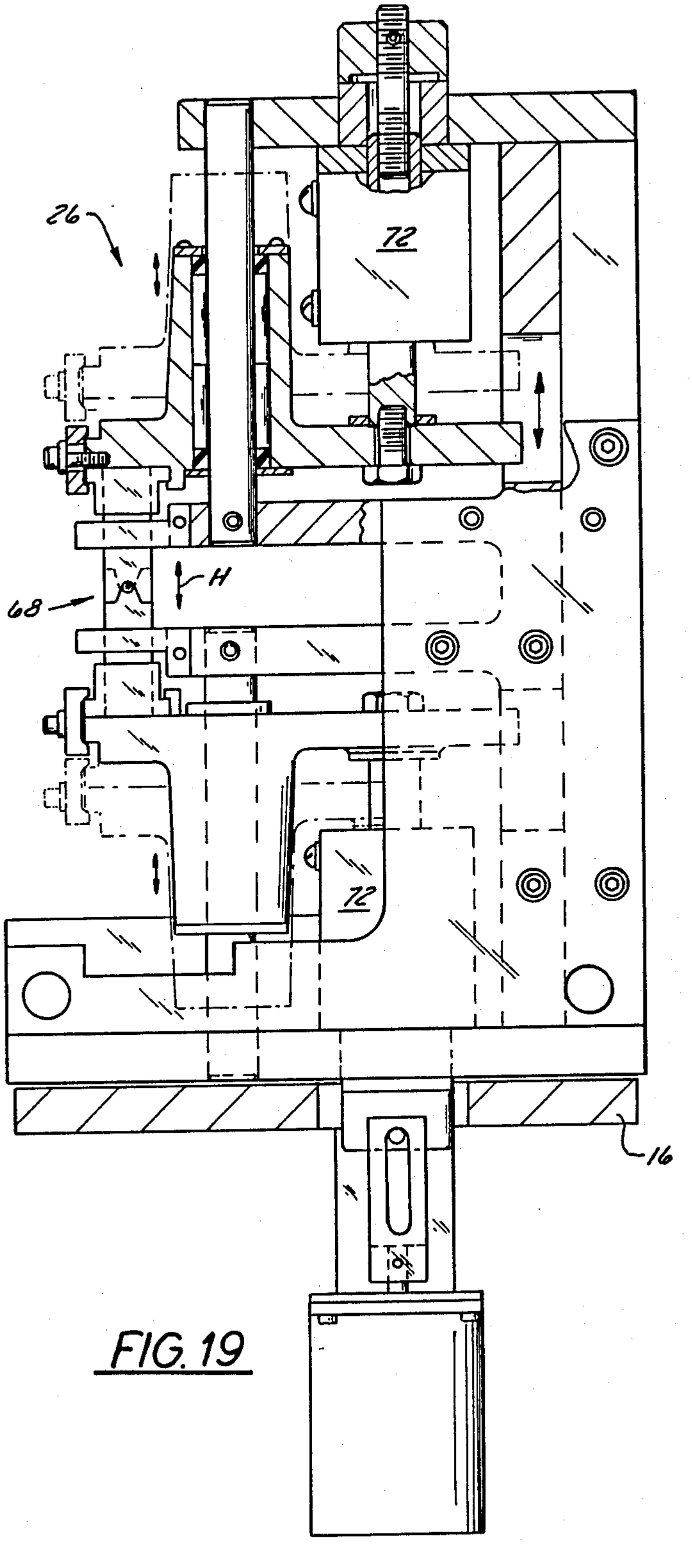
FIG. 19 is an end elevation view of the wire cutter-stripper mechanism taken on line 19—19 of FIG. 17.
Figure 20:
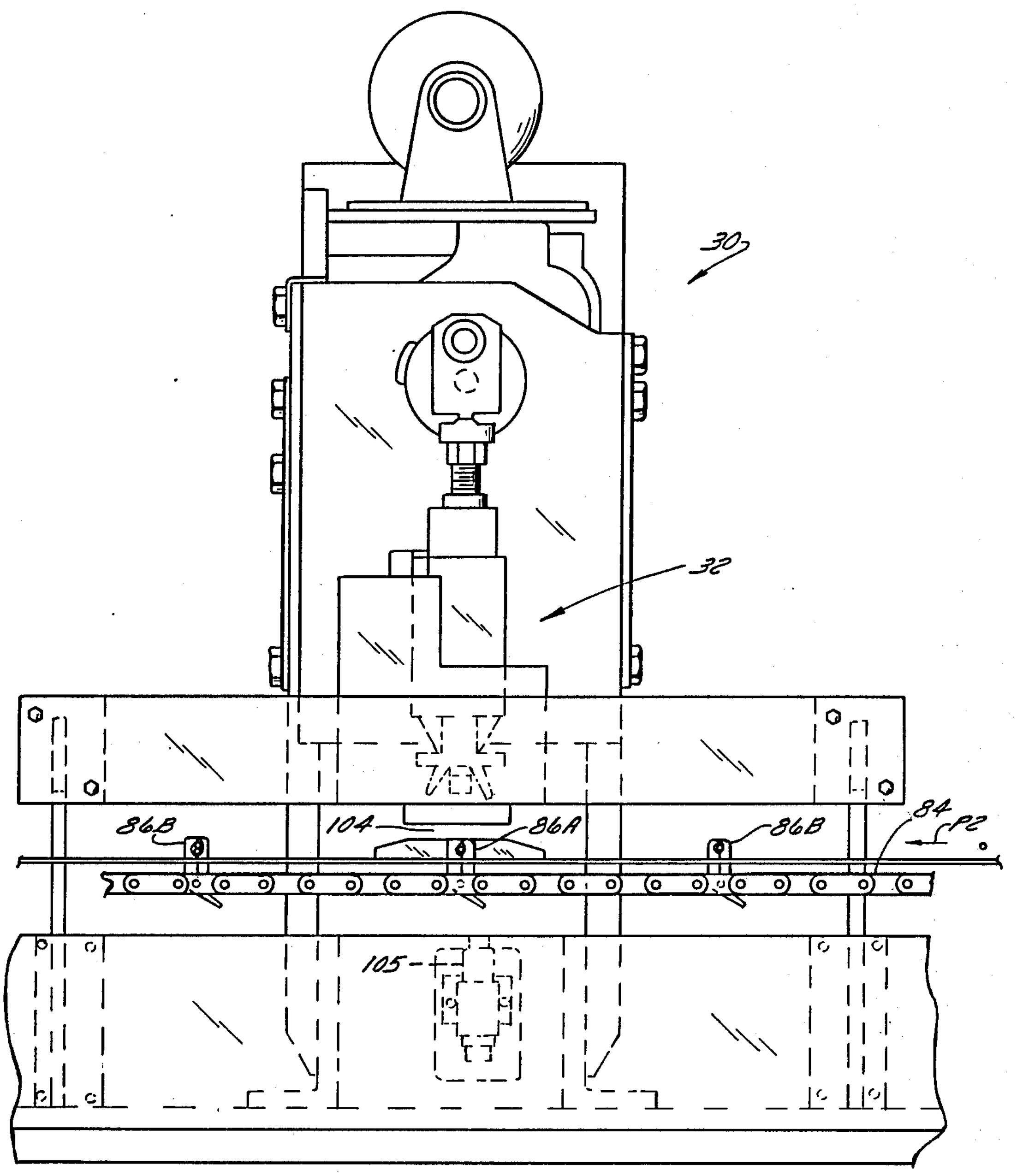
FIG. 20 is an enlarged end elevation view of a third terminal attachment press and a wire doubler mechanism of FIG. 1.

Referring to FIGS. 1, 4, 8, 11, 15, 17 and 19, wire cutter-stripper mechanism 26 comprises a cutter-stripper device or head 68 having an actuator 70 (FIGS. 11, 13 and 15) selectively operable to move the cutter-head 68 in the direction of an arrow F (FIG. 17) between extended and retracted positions for a distance of about $\frac{5}{8}$ of an inch, and further having an actuator 72 (FIGS. 17 and 19) selectively operable to move cutter-stripper blades 74 in head 68 between open and closed positions in the direction of an arrow H (FIGS. 17 and 18).

Referring to FIG. 17, when a desired length of wire strand A or B extends through cutter-stripper mechanism 26 the actuator 65 (FIG. 8) operates to close the turret jaw 52A or 52B and the actuator 72 operates to close the blades 74 and sever a wire segment 12A or 12B, respectively, of desired length. After severance, the appropriate turret jaw 52A or 52B closes and retracts (i.e. in the direction of arrow I in FIG. 17 toward the upstream end of path P1) to effect stripping of insulation from the newly-severed end of the wire strand A or B. At the same time, the actuator 70 (FIG. 15) operates to move head 68 to retracted position (i.e. in the direction of arrow F in FIG. 17 toward the upstream end of path P1) to effect stripping of insulation from the newly-severed end of the wire segment 12A or 12B. Since the closed conveyor clamp 86A or 86B does not provide sufficient force to hold the wire segment 12A or 12B therein against axial movement during a stripping operation, an actuator 81, hereinafter described as part of the wire gathering mechanism 27, operates to press the unsevered wire segment between a ramp 76 and a vertically movable plate 83 connected to actuator 81 to hold it securely.

Wire Gathering Mechanism

Referring to FIGS. 1, 8, 11, 12, 17 and 18, wire gathering mechanism 27 is located near the infeed or upstream end of conveyor mechanism 28 and comprises plate or ramp 76 which is selectively movable between two positions (raised and lowered) by an actuator 80. As FIG. 17 makes clear, in raised position, ramp 76 defines a ramp which enables a wire strand being fed through cutter-stripper mechanism 26 to pass over the conveyor mechanism 28. In its lowered position, ramp 76 moves down to expose the side of a conveyor clamp, hereinafter described, and allows a wire strand to be directed into the said conveyor clamp which is in open position. Mechanism 27 further comprises jaws 78 which are mounted on plate 83, hereinbefore referred to, and are movable upwardly and downwardly with plate 83 between open and closed position by actuator 81 and operate to guide a wire strand down and between an open conveyor clamp.

Conveyor Mechanism

Referring to FIGS. 1, 4, 8, 11, 12, 17, 20, 21, 22, 23, 24 and 25, the conveyor mechanism 28 comprises an endless flexible conveyor chain 84 which is provided with a plurality of separable conveyor clamps, such as clamps 86A and 86B, which are spaced apart from one another at intervals along the chain. The clamps 86A and 86B are identical to each other in construction and mode of operation and are arranged alternating along chain 84 in the order 86A—86B—86A—86B, etc. Each clamp 86A is adapted to receive wire strand A and to releasably grip and convey a wire segment 12A cut therefrom. Each clamp 86B is adapted to receive wire strand B and to releasably grip and convey a wire segment 12B cut therefrom. As FIG. 1 shows, chain 84 is reeved around an idler sprocket 88 located at the infeed end of the conveyor mechanism 28 and a drive sprocket 90 located at the output end of the conveyor mechanism. Drive sprocket 90 is connected to and driven by a drive pulley 91. An endless flexible chain 92 is reeved around drive pulley 91 and is ultimately driven by a pulley 93 on the drive shaft of an electric motor 94. Referring to FIGS. 1 and 12, when in operation, the upper flight of chain 84 and the conveyor clamps 86A and 86B therealong move in steps in the direction of an arrow G (FIG. 1) along a second path P2 (FIG. 1) which is transverse (i.e., perpendicular in a horizontal plane) to first path P1 (FIG. 1). Each conveyor clamp 86A and 86B is actuatable between an open and closed positions, as comparison of FIGS. 12, 23 and 24 make clear. In open position (see FIGS. 1 and 24) it can initially receive a wire strand and subsequently release a wire segment. In closed position it can grip a wire strand while the strand is being severed and stripped (see FIG. 12) and can also grip and convey a wire segment cut from the strand, as well as a finished wire harness 12 (see FIGS. 1 and 23 through 25). The chain 84 is driven in indexed fashion (i.e., in steps or increments) so that each conveyor clamp 86A and 86B first moves, while open, to a receiving station 100 (see FIG. 1) directly opposite the outlet end of cutter-stripper mechanism 26 wherein an actuator 102 (see FIG. 12) subsequently operates to close the clamp. Then, each closed clamp 86A and 86B with a wire segment 12A and 12B, respectively, moves along second path P2 in steps and eventually reaches a terminating location or station 104 (see FIGS. 1 and 23 through 25) directly opposite the third terminal attachment press 30 whereat a selectively operable solenoid actuator 105 effects opening thereof.

Wire Lifter or Doubler Mechanism

Referring to FIGS. 1, 21, 22, 23, 24 and 25, wire lifter or doubler mechanism 32 is located at terminating station 104 directly opposite press 30 and comprises a separable lifter jaw 106 and an actuator 108 selectively operable to open and close the lifter jaw and an actuator 110 selectively operable to raise and lower the lifter jaw.

Figure 22:
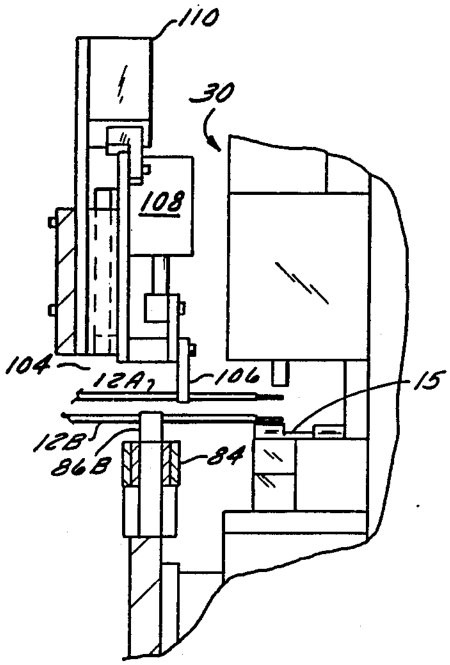
FIG. 22 is a view, similar to FIG. 21, and showing the doubler mechanism in another stage of operation.
Figure 21:
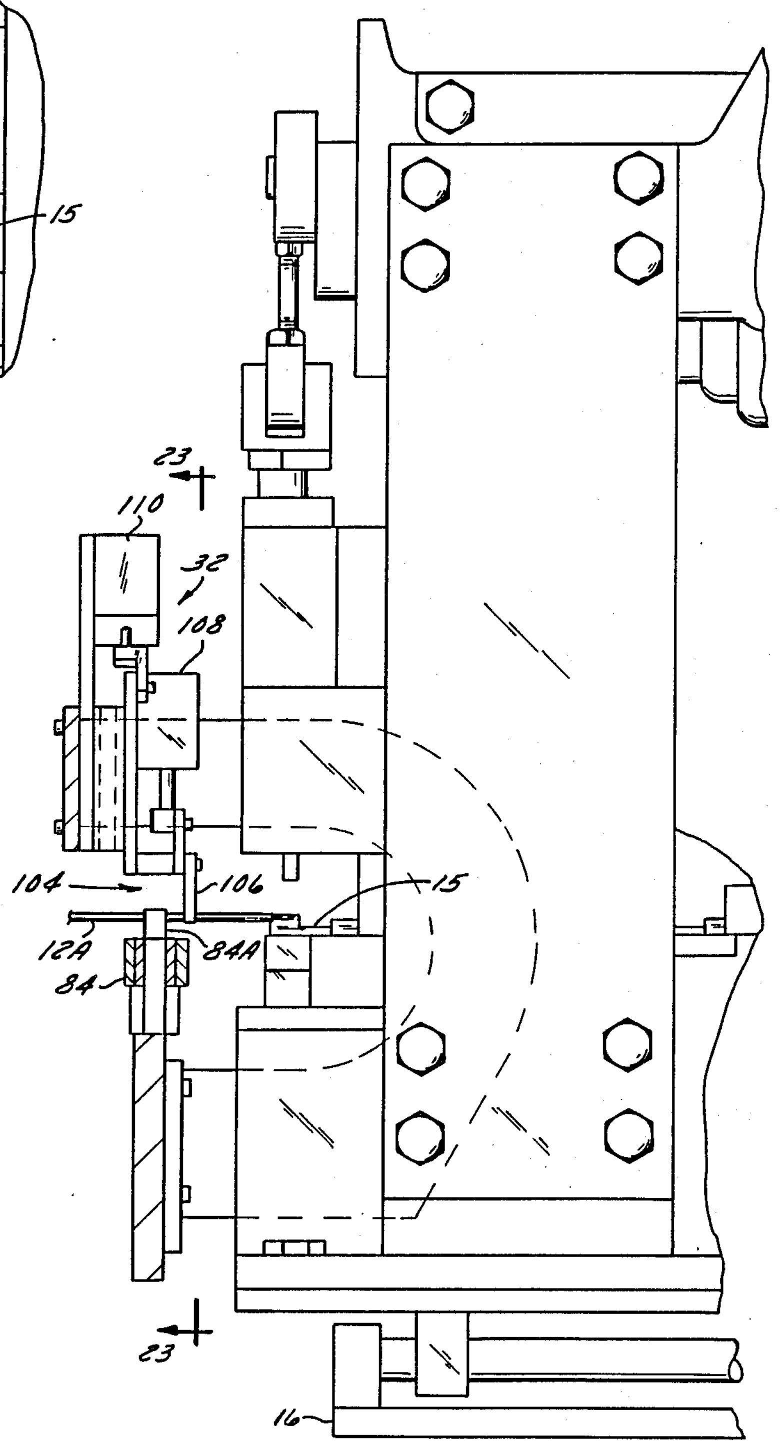
FIG. 21 is a side elevation view of the mechanisms shown in FIG. 20 and showing the doubler mechanism in one stage of operation.
Figure 23:
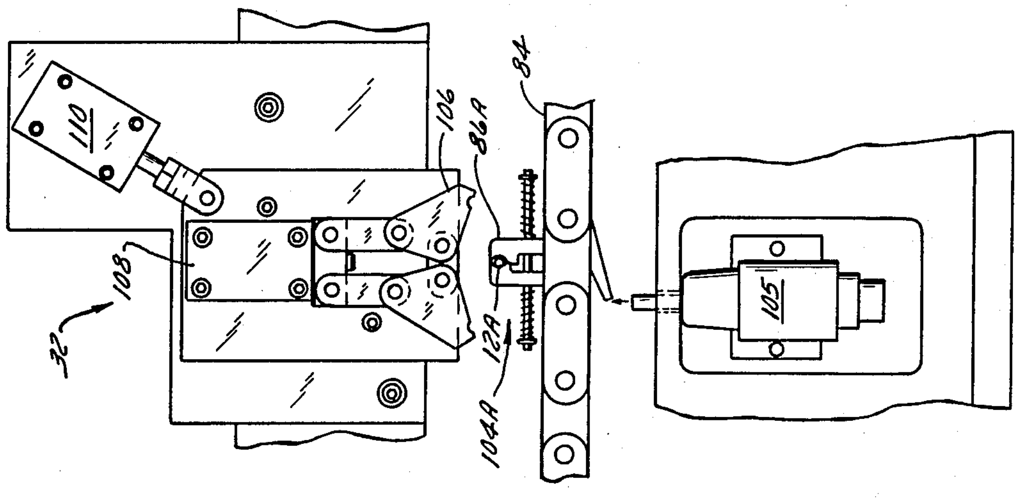
FIG. 23 is a front elevation view of the doubler mechanism taken on line 23—23 of FIG. 21.
Figure 24:
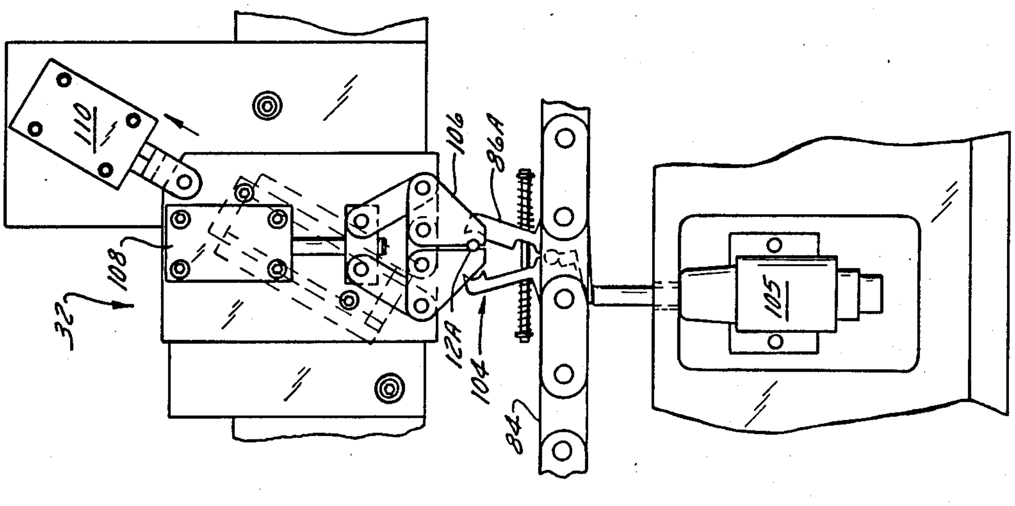
FIGS. 24 and 25 are views similar to FIG. 23 but showing the doubler mechanism in other stages of operation.
Figure 25:
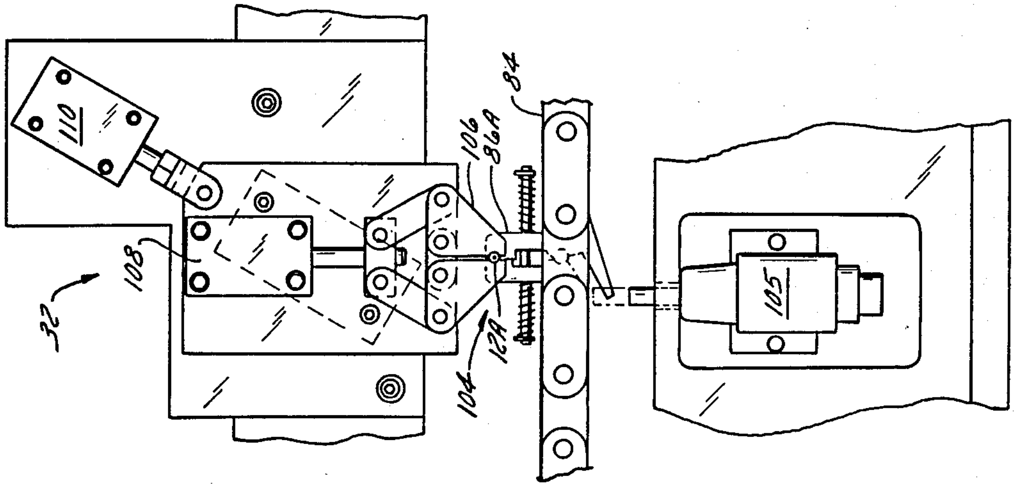

Referring to FIGS. 1, 21 and 23, when a conveyor clamp 86A reaches station 104, the lifter jaw 106 is open and moves downwardly to close and grip wire segment 12A in conveyor clamp 86A. Whereupon, as FIGS. 24 and 22 show, clamp 86A opens to release its grip on the wire segment 12A. Then lifter jaw 106 with wire segment 12A gripped therein moves upwardly to raised position. When conveyor mechanism 28 indexes, the next successive conveyor clamp 86B moves to station 104 and is directly beneath and closely adjacent to lifter jaw 106, as shown in FIG. 22. Thereupon, third terminal press 30 operates to attach a common terminal 15 to the stripped unterminated severed ends of both wire segments 12A and 12B to thereby complete the fabrication of a wire harness 12. Thereafter, as FIG. 1 makes clear, lifter jaw 106 opens (see FIG. 23) to release its grip on wire segment 12A and conveyor mechanism 28 indexes so as to move conveyor clamp 12B, with a harness 12 gripped thereby, downstream of station 104 for ultimate disposal. Lifter jaw 106, when in the position shown in FIG. 23, is now in readiness for its next cycle of operation. U.S. Pat. No. 4,653,160 discloses in detail such a wire doubler mechanism, its mode of operation and control means therefor.

Operation

In operation, both wire strands A and B are initially arranged so that the free unstripped ends thereof are within turret jaws 52A and 52B, respectively, jaw 52A will be open, jaw 52B will be closed. The jaws are radially spaced apart 90° on turret 48. Referring to FIG. 11, the first jaw 52A with the first strand A therein is initially positioned adjacent the cutter-stripper mechanism 26 and the second jaw 52B with the second strand B therein is initially positioned adjacent the second press 24B. A predetermined length of the free end of first strand A is then fed by the wire feed mechanism through open turret jaw 52A, through cutter-stripper mechanism 26, through gathering mechanism 27 and over the top of a first conveyor clamp 86A at station 100. While this occurs, the second jaw 52B presents the free unstripped end of strand B thereof to the second press 24B for attachment of a terminal 14B thereto. Then, turret jaw 52A closes to grip first strand A, gathering mechanism 27 enables first conveyor clamp 86A to receive and grip first strand A, and cutter-stripper mechanism 26 closes to sever a first wire segment 12A from first strand A. Then, after ramp 76 and plate 83 close, turret jaw 52A retracts or moves away ($1\frac{1}{4}''$) from cutter-stripper mechanism 26 to strip the severed end of wire strand A. The cutter-stripper mechanism 26 moves away ($\frac{3}{8}''$) from the closed first conveyor clamp 86A to strip the severed end of wire segment 12A. Then, as FIG. 15 shows, turret 48 pivots 90° in one direction to present jaw 52A with the newly-severed end of strand A therein to the first terminal press 24A whereat a terminal 14A is attached. Such turret pivoting also places jaw 52B with second strand B therein adjacent cutter-stripper mechanism 26 in readiness for a repeat of the aforedescribed cycle of operation but wherein strand A is terminated while strand B is fed.

Immediately after first wire segment 12A is severed and stripped, conveyor mechanism 28 indexes to move the first conveyor clamp 86A with first wire segment 12A therein away from cutter-stripper mechanism 26 and toward the location 104 whereat third terminal press 30 and lifter/doubler mechanism 32 are in position. At the same time, conveyor mechanism 28 moves an empty open second conveyor clamp 86B to location 100 adjacent cutter-stripper mechanism 26 vacated by first conveyor clamp 86A.

A predetermined length of the free end of second wire strand B is then fed by wire feed mechanism 20 through the second open turret jaw 52B and a second wire segment 12B is cut therefrom in the same manner as above-described. At the same time, first terminal press 24A attaches a terminal 14A to the severed, stripped free end of first strand A. The second wire segment 12B cut from second wire strand B is received in the second conveyor clamp 86B and is also moved toward location 104. Thereafter, turret 48 pivots 90° in the opposite direction to place the now-terminated first strand A adjacent cutter-stripper mechanism 26 and to place the now-stripped second strand B adjacent second terminal press 24B. The above cycle is repeated as often as desired.

As conveyor mechanism 28 operates, the first and second conveyor clamps 86A and 86B with the first and second wire segments 12A and 12B, respectively, therein, eventually reach location 104 adjacent third terminal press 30. When the first conveyor clamp 86A reaches location 104, wire lifter or doubler mechanism 32 lifts first wire segment 12A therefrom and holds it in raised position until second conveyor clamp 86B reaches a position therebeneath, whereupon third terminal press 30 attaches a common terminal 15 to the stripped unterminated adjacent ends of the first and second wire segments 12A and 12B. The above cycle is repeated for each successive pair of first and second wire segments.

We claim:

1. A method of processing wire comprising the steps of:
   - providing a plurality of wire strands, each strand having a free end;
   - feeding one wire strand to which a terminal has been attached in one direction along a path to provide a wire segment of predetermined length;
   - severing said wire segment to which a terminal has been attached from said one wire strand at a location along said path after a predetermined length has been fed;
   - and attaching a terminal to the free end of another wire strand while said one wire strand is being fed and severed.

2. A method according to claim 1 wherein said wire strands are insulated and including the steps of stripping insulation from the newly-severed free end of said one wire strand after said wire segment is severed and stripping insulation from the newly-severed end of said wire segment while said terminal is being attached to the free end of said another wire strand.

3. A method of processing wire comprising the steps of:
   - providing a first wire strand and a second wire strand, each wire strand having a free end;
   - attaching a terminal to the free end of said first wire strand;
   - feeding said first wire strand with a terminal attached thereto in one direction along a path and severing a first wire segment therefrom while attaching a terminal to the free end of said second wire strand;

conveying said first wire segment to a predetermined location;

feeding said second wire strand with a terminal attached thereto in said one direction along said path and severing a wire segment therefrom while attaching a terminal to the newly-severed end of said first wire strand; conveying said second wire segment to said predetermined location;

the steps of severing a wire segment from its respective wire strand being effected after a predetermined length of a respective wire strand has been fed in said direction along said path;

and attaching a common terminal to the unterminated ends of both wire segments at said predetermined location.

4. A method according to claim 3 wherein the wire strands are insulated and including the step of stripping insulation from the newly-severed ends of one wire strand and a wire segment severed therefrom. While a terminal is being attached to the free end of the other wire strand.

5. A method of providing a wiring harness comprising a plurality of wire segments, each segment having one end connected to an individual terminal and having its other end connected to a common terminal, said method comprising the steps of:

providing a plurality of wire strands, each strand having a free end;

attaching an individual wire terminal to the free end of one strand while feeding along a path and severing a wire segment from at least one other strand to which an individual wire terminal has already been attached;

conveying the wire segment severed from said other strand to a remote location;

attaching an individual wire terminal to the newly-severed free end of said other strand after a wire segment has been cut therefrom and while simultaneously feeding along a path and severing a wire segment from said one strand to which an individual wire terminal has already been attached;

conveying the wire segment severed from said other strand to said remote location;

and attaching a common wire terminal to the unterminated ends of the wire segments at said remote location.

6. Wire processing apparatus comprising means for alternately feeding a pair of wire strands in one direction along a common path;

means to sever at a location along said path a wire segment of predetermined length from said other wire strand fed prior to feeding said one wire strand;

and means for attaching a terminal to a free end of one wire strand, while the other wire strand is being fed in said one direction along said path.

7. Wire processing apparatus comprising:

means for alternately feeding a pair of wire strands;

wire cutter means through which a wire strand is fed after a terminal is attached thereto, said wire cutter means being operable to sever a wire segment from a wire strand fed therethrough;

means for attaching a terminal to the free end of one wire strand while the other wire strand is being fed and wire segment is being severed therefrom;

and means for moving a wire segment away from said cutter means to a remote location.

8. Wire processing apparatus according to claim 7 further comprising means at said remote location for attaching a terminal to the unterminated end of a wire segment at said location.

9. Wire processing apparatus according to claim 7 further comprising means at said remote location for attaching a common terminal to the unterminated ends of a plurality of wire segments at said remote location.

10. Wire processing apparatus according to claim 7 or 8 or 9 wherein said means for attaching a terminal to the free end of one wire strand while the other wire strand is being fed and severed comprises:

wire placement means selectively movable between two positions and comprising a pair of spaced apart releasable jaws, each jaw being adapted to releasably hold the free end of a wire strand;

and a pair of terminal presses disposed at different fixed locations relative to said wire placement means;

said wire placement means being operable, when in one of said positions, to enable the free end of one wire strand to be fed through said cutter means and to enable the free end of the other wire strand to be presented to one of said terminal presses;

said wire placement means being further operable, when in the other of said positions, to enable the free end of said other wire strand to be fed through said cutter means and to enable the free end of said one wire strand to be presented to the other of said terminal presses.

11. Wire processing apparatus according to claim 10 wherein said means for alternately feeding a pair of wire strands comprises:

a pair of separable drive members selectively movable between an open position and a closed position, said drive member when in open position being adapted to receive one or the other of said pair of wire strands therebetween, said drive members when in closed position being operable to move a wire strand disposed therebetween along a path;

and means for selectively shifting either one of said pair of wire strands between said pair of separable drive members while the latter are in open position.

12. Wire processing apparatus comprising:

means for alternating feeding a pair of wire strands;

means for attaching a terminal to the free end of one wire strand while the other strand is being fed and severed and comprising a rotatable turret having a pair of spaced apart turret jaws thereon for receiving said wire strands and having first and second terminal presses disposed in two different fixed positions relative to said turret;

each of said turret jaws being operable to releasably grip the free end of a wire strand;

means for receiving a wire strand from one turret jaw and operable for severing a wire segment therefrom while the other turret jaw presents the other wire strand to one of said terminal presses and a terminal is attached thereto;

conveyor means having a plurality of spaced-apart conveyor clamps thereon for conveying wire segments severed from said wire strands to a predetermined location;

and means for attaching a common terminal to the unterminated ends of wire segments at said predetermined location and comprising:

means for removing a wire segment from a conveyor clamp in which it was conveyed and for aligning it with another wire segment in a conveyor clamp;

and third terminal press for attaching said common terminal to the aligned wire segments.

13. Wire processing apparatus according to claim 12 wherein said wire strands are insulated;

wherein said means for receiving a wire strand and operable for severing a wire segment therefrom comprises insulation stripping means operable to move relative to said turret and relative to a conveyor clamp in which a wire segment is gripped during a stripping operation;

and wherein each of said turret jaws is further operable to move between extended and retracted positions relative to said conveyor clamp in which a wire segment is gripped during a stripping operation.

14. Wire processing apparatus according to claims 12 or 13 wherein said means for removing a wire segment from a conveyor chain comprises a lifter jaw for releasably gripping a wire segment and raising it to a raised position, and wherein said conveyor mean operates to move another wire segment beneath the wire segment in raised position, whereby said third terminal press is able to attach said common terminal to both wire segments.

15. Wire processing apparatus comprising:

wire feed means for alternately feeding a pair of insulated wire strands along a path;

first and second terminal presses located on opposite sides of said path downstream of said wire feed means;

a wire placement means comprising a member disposed on said path between said terminal presses and having a pair of wire-gripping jaws mounted in spaced-apart relationship on said member, said member being oscillatedly rotatable between two positions, each jaw being selectively operable between open and closed conditions and being selectively movable between extended and retracted positions relative to said member:

and wire cutter-stripper means downstream of said wire placement means and being selectively operable between open and closed conditions and being selectively movable along said path relative to said rotatable member between extended and retracted positions;

said member when in one position operating to maintain one jaw adjacent said wire cutter-stripper mechanism and the other jaw adjacent one of said terminal presses, said member when in its other position operating to maintain the other jaw adjacent said wire cutter-stripper mechanism and the said one jaw adjacent the other of said terminal presses.

16. A wire placement mechanism for use in wire processing apparatus comprising:

a member oscillatable rotatable about its axis between two spaced-apart positions, and a pair of wire-gripping jaws mounted in spaced-apart relationship on said member, each jaw being selectively operable between open and closed conditions, each jaw being further selectively movable between extended and retracted positions relative to said member.

* * * * *